(12) United States Patent
Price

(10) Patent No.: US 7,090,266 B1
(45) Date of Patent: Aug. 15, 2006

(54) DING-STOPPER

(76) Inventor: Pamela Sharron Price, 1922 Mariner La., Woodbridge, VA (US) 22192

( * ) Notice: Subject to any disclaimer, the term of this patent is extended or adjusted under 35 U.S.C. 154(b) by 525 days.

(21) Appl. No.: 10/454,457

(22) Filed: Jun. 5, 2003

Related U.S. Application Data

(60) Provisional application No. 60/387,094, filed on Jun. 10, 2002.

(51) Int. Cl.
    *B60R 19/42* (2006.01)
(52) U.S. Cl. .............. 293/128; 296/136.02; 280/770
(58) Field of Classification Search .......... 296/136.01, 296/136.1, 136.13, 135, 152, 136.02, 98, 296/207, 77.1; 293/128; 135/88.05; 280/770; 150/166
    See application file for complete search history.

(56) References Cited

U.S. PATENT DOCUMENTS

| | | | |
|---|---|---|---|
| 3,263,736 A * | 8/1966 | Macomson | 160/370.21 |
| 4,014,583 A * | 3/1977 | Forbes | 293/128 |
| 4,639,027 A * | 1/1987 | Boyd | 292/128 |
| 4,643,471 A * | 2/1987 | Fishback | 293/128 |
| 4,750,767 A * | 6/1988 | Barnett | 293/128 |
| 4,849,272 A * | 7/1989 | Haney et al. | 428/102 |
| 5,050,925 A * | 9/1991 | Brown | 296/136.03 |
| 5,072,979 A * | 12/1991 | Swinton | 293/128 |
| 5,129,695 A * | 7/1992 | Norman, II | 293/128 |
| 5,275,460 A * | 1/1994 | Kraus | 296/136.13 |
| 5,320,392 A * | 6/1994 | Hart | 293/128 |
| 5,799,975 A * | 9/1998 | Crick | 280/770 |
| 6,186,564 B1 * | 2/2001 | Ashcroft | 293/128 |
| 6,254,170 B1 * | 7/2001 | Farmer et al. | 296/136.07 |
| 6,283,518 B1 * | 9/2001 | Burtin | 293/142 |
| 6,406,080 B1 * | 6/2002 | Davis | 293/128 |
| 6,457,755 B1 * | 10/2002 | Nieto | 293/128 |

FOREIGN PATENT DOCUMENTS

JP          405286367 A  * 11/1993 ................. 293/128

* cited by examiner

*Primary Examiner*—D. Glenn Dayoan
*Assistant Examiner*—Greg Blankenship

(57) ABSTRACT

A vehicle side protector against dents and scratches due to the impact of a door of an adjacent vehicle. Comprised of high-density blocks, covered with a non-scratch fabric. Attached are strips of covered pads for the purpose of protrusion that will cause the apparatus to fit vehicles with curves, and to prevent smacking sound on contact. Magnetic strips are applied to the strips of covered pads to secure the apparatus to the vehicle. The strap consists of a long strip, and a thick tip joined together to prevent easy theft.

8 Claims, 2 Drawing Sheets

DING-STOPPER

This application claims benefit of filing Date of Provisional Application No. 60/387,094 filed Jun. 10, 2002.

BACKGROUND

This invention relates to the protection of a vehicles' longitudinal side panel. The invention protects it from dents (dings) and scratches that occur due to the impact of another vehicles' door.

BACKGROUND—DESCRIPTION OF PRIOR ART

For years there has been a major problem of parked vehicles in parking lots receiving dents (dings) and scratches from the adjacent vehicle parked next to it. These dents and scratches come from the carelessness of a person opening their door onto the vehicle parked adjacent to theirs.

Up to this time neither the automobile industry nor any other has been successful in solving this problem through a device that will totally satisfy all vehicle owners. The reason being is because the prior inventions either involved complicated installation procedures, causing an inconvenience; weighed too much; hard to store, or easy to steal from the vehicle.

In my research it is found that many of the prior guards are complicated in set-up. They take too much time and are inconvenient to the vehicle owner. Examples of this are U.S. Pat. No. 4,437,697 to Paul B. Hinojos (1984), U.S. Pat. No. 4,726,614 to Myers et al. (1988), U.S. Pat. No. 4,277,526 to Jackson (1981), U.S. Pat. No. 4,753,467 to DeCaluwe et al (1988), U.S. Pat. No. 4,398,758 to Tabares (1983), and U.S. Pat. No. 4,014,583 to Forbes (1977). These have shown to be either complicated in set-up, or very hard to fold for storage.

Another found problem is that some of the prior inventions are thin in width, which leaves the vehicle with unprotected areas and vulnerable, awaiting the wrong model vehicle to park next to it. These deficiencies can be found instant in U.S. Pat. No. 4,493,502 to Campbell, Jr. (1985), U.S. Pat. No. 4,010,297 to Wenrick (1977), U.S. Pat. No. 5,879,037 to Batiste (1999), and U.S. Pat. No. 4,221,412 to Miller (1980). These and many of the other aforementioned patents also have this problem.

It is also found that some are too large, obscuring the beauty of the vehicle, causing it to look unattractive. Additionally, they are complicated in set-up, and take up too much space in storage. Some prior inventions requiring additional parts to be added to the vehicle in order for it to work sufficiently. For instance, in U.S. Pat. No. 4,750,767 to Barnett (1988), U.S. Pat. No. 4,530,519 to Marshall (1985), and U.S. Pat. No. 4,217,715 to Bryan, Jr. (1980).

In U.S. Pat. No. 4,810,015 to McNeil (1989) it mentions the use of plurality of magnets, in which many of these types of devices use but, here and in many others, a piece of cloth covers over the magnets. This causes concerns as to this type of device's ability to securely adhere to the vehicle's body. This patent's device can also be rolled for storage, which raises the question whether the thickness or density is strong enough to withstand an impact. Straps are attached, which requires an addition part to be added to the vehicle. This causes an inconvenience.

It is believed after testing, that the reason magnets in recent inventions were not put on the outside of the device is because of the notable smacking sound that is heard when the magnet makes contact with the vehicle. This would discourage vehicle owners from purchasing the device for fear of the device marring the surface. For instants U.S. Pat. No. 5,312,145 to McNeil (1994), it uses a polymer of magnets and bonds to foam, and then cover with fabric to form it's panel. This reduces the force of attraction between magnet and door panel, thereby weakening the contact of the invention onto the vehicles' side panel. This device also has unnecessary thickness serving as a double folding hinge, stitched with 2 parallel lines, holding material inside, serving as the fold. This adds unnecessary weight. Here the device is made where the cloth is touching the vehicle, possibly causing scratches to the vehicle through normal application of the product. Finally, it does not have a security latch attached to prevent theft.

In our competitive automobile industry, there are many different makes and models of vehicles today. A lot of the vehicles' sides are no longer flat, but rather have curves on their side body. It is found that in order for a device to adequately be able to fit at least most of these vehicles today and give protection, the device itself would need to protrude away from the vehicle to accommodate these curves. None of the above mentioned inventions make this protrusion accommodation.

SUMMARY

In accordance with the present invention, this device serves as a dent and scratch protector from an adjacent vehicle's door. It is comprised of flexible pad blocks, which are coextensive in the area within the panel. Generally, the number of blocks ranges from 3 to 5, and they are covered with material. Strips of flexible covered pads are joined to the upper part of the panel. Generally, the amount of these strips is the same as the blocks. The covered padded strips length extends from side-to-side, the distant of each block. Magnetic strips are placed on top of each covered padded strip. A longitudinal flexible strap with a tip extends from between one of the divide blocks. Its purpose is to prevent the panel from being easily removed from the vehicle. Strap is attached to the panel by means of stitching to the material between selected blocks.

Typically the said invention dimensions length and width may vary depending on the make of the vehicle. The shape of the panel is rectangular. Blocks are vertically divided, and stitched across. Blocks thickness may vary. Covered padded strips thickness may also vary. They may be placed on the blocks from the center to the upper portion. The strap is of sufficient such that it will fit inside of the vehicle's door, with enough clearance for the strap door to close onto the strap. Below is a list of the invention's objects and advantages.

a) It is double-padded for two reasons. Firstly, to cause a protrusion of the embodiment, which enables it to fit on vehicles with curves, and secondly to cushion the smacking sound made upon contact, bringing the panel closer to the vehicle.

b) It prevents scratches that could come from the constant application of material making contact to the vehicle. Magnets are applied on the outside.

c) The magnets are replaceable and can be kept clean.

d) In that the magnets are placed on the outside of the covered padded strips to cause protrusion, the invention has a stronger hold to the vehicle. This causes it to have a better chance of adhering longer to the vehicle during high winds.

e) The said invention is easy to fold, because the panel interior blocks are spaced. The stitches are between the blocks onto the material widthwise, which causes the panel to be lightweight, and free of unneeded materials.

f) No addition parts will need to be attached to any vehicle in order for the said invention to work properly.

g) It has a security strap that can be applied easily and because of its broad tip, makes it difficult for the panel to be removed from the vehicle while unattended.

Figure 1:
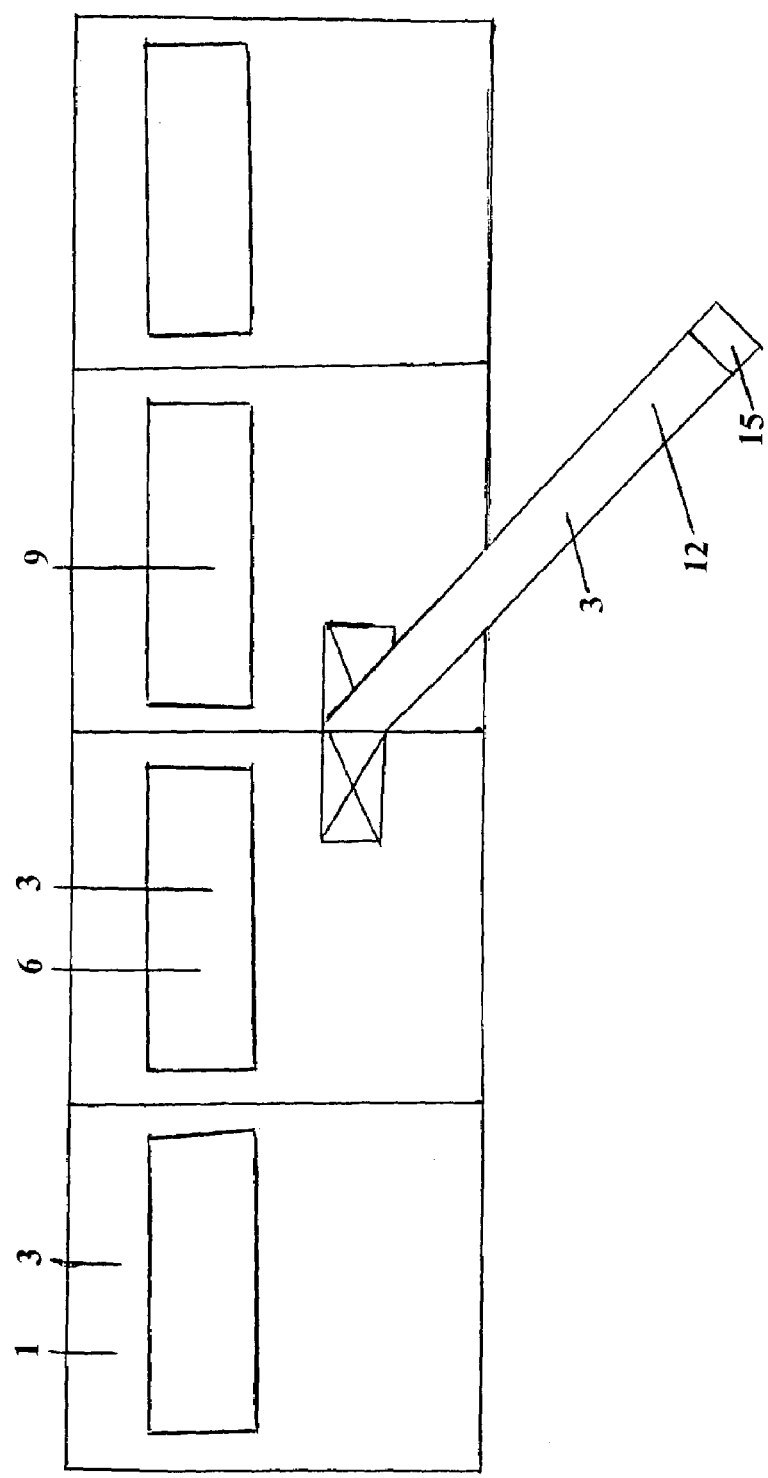
FIG. 1 shows in full view the rear of the invention longitudinal. It shows the side that magnetize to the vehicle.

REFERENCE NUMERALS IN DRAWINGS 1 divided blocks
3 material
6 strips of covered pads
9 magnetic strap
12 strap
15 tip
24 divide lines
27 protrusion

DETAIL DESCRIPTION

FIG. 1 of the drawing is a full view of the apparatus in its entirety. The invention has an exterior surface, an interior surface, a thickness, an upper border, a lower border, and two sides borders. It is made to fit any make and model sedan, truck, SUV, and van. The said invention is rectangular in shape, and its purpose is to attach to the side body of a vehicle. It is to fit underneath the door handles, onto the doors of the vehicle longitudinally between the front and rear wheels. Being that there are many makes and models, the width and length of the panel may vary. To accomplish this variance, the panel would be altered by means of the divided blocks. Adding additional blocks would increase the length and width. Therefore, throughout my description of this invention an example width, length, thickness, and number of sections will be used to further explain this invention. The example will be that of four divided blocks, 19.5 in. each in length, 11 in. each in width, and ⅝ in. each in thickness. The four covered padded strips will be 12 in. each in length, 3 in. each in width, and ⅜ in. in thickness. The four flexible magnet strips will be 12 in. each in length, and 3 in. each in width. The length of the strap used in this example is that of 21 inches.

Figure 2:
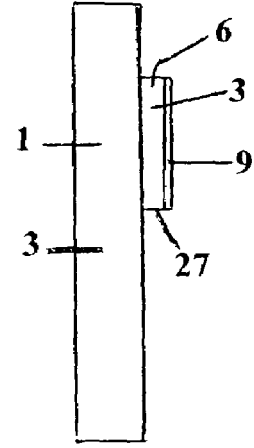
FIG. 2 shows the side view of FIG. 1.

This invention FIG. 1 is first comprised of four equally divided blocks 1. The interior surface is that of padding, preferably the use of foam. Generally, it is good to use a polyethylene, crosslink type of foam. The padding should be strong in density, and slightly bendable. It's thickness FIG. 2 ranges from ½ inches to 1½ inch. The padding should be thick enough to protect the vehicle from the force of an adjacent car's door opening upon it. The panel is divided, and sectioned by means of the interior padding.

The invention is covered preferably with a non-scratch material 3. The amount of the material should be enough to cover all four interiors padding with no pads exposed. A stitch is sown across the upper and the lower borders of the material, across the width of the two side borders, and between each divided adjacent sections. Stitches across the width of the material secure the pads in its place. This provides the panel the ability to fold for easy storage FIG. 4, 24.

The four padded strips are totally covered by material 6, 3. These strips of covered pads should be sufficient in width to at least adhere to the vehicle securely. The length of the covered pads should extend across the length of each multi-section of the panel. The length of these does not have touch the side edge or the top border of each section. The placement of the strips of covered pads should be placed toward the upper portion of the blocks. The thickness ranges from ⅜ inch to ½ inch. The purpose in the placement of the covered padded strips of each divided block is to cause a protrusion effect FIG. 2, 27. The same material used for the divided blocks will suffice for the covering of the strips of pads. The strips of covered pads 3, 6 are attached to each divided blocks 1, 3 preferably by stitching.

Because some vehicles either have door handles that protrude outwardly, curves on the vehicle's body, or permanent door guards along the mid section of the vehicle, the said invention is designed so that the covered padded strips will be able to make contact with the surface of all vehicles no matter the make or model. Also, because these strips are placed on each divided block, a couple of inches from the top border, the panel is able to protrude from a certain point FIG. 2, 27, giving protection to the upper part of the vehicle's body.

Flexible magnetic strips 9 with adhesive on the back are cut to the same width and length of the strips of covered pads. The magnetic strips 9 are placed on top of each of the covered pads 3, 6, 9. The adhesive side of the magnet should be laid on top of the material 3, and the magnetic side should be faced outwardly 9.

Figures 3, 4:
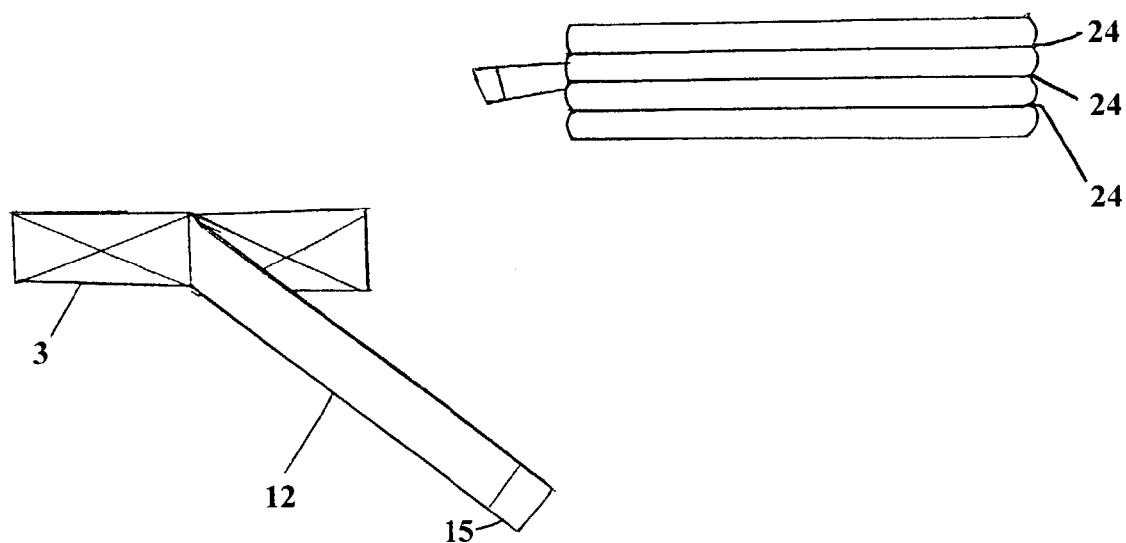
FIG. 3 shows the security strap of the invention.
FIG. 4 shows the invention in a fold position.

The interior surface of the strap, the upper part and the tip FIG. 3 is made of flexible material. The preferred choice is rubber, but other materials may also be used. The strap is attached to the panel for the purpose of security, and as a theft preventive mechanism. The purpose of the strap is to prevent the panel from being removed from the vehicle. The tip of the strap 15 is shorter in length and thicker then the upper part of the strap 12. The range of the tip is from ½ inch to 6 inches in length, and ½ inch to 4 inches in width. The thickness should be thick enough as to not be able to pull out of the vehicle's door while closed. The thickness could range from ½ inch to 1½ inches. The upper part of the strap is generally long in length 12. It can range from 6 inches to 25 inches in length, and ½ inch to 4 inches in width. The thickness of the strap should be thin enough for the vehicle's door to be able to close onto it.

The two pieces of interior surface of the strap 12, 15 are covered with material 3, preferably the same material used to cover the small strips of pads and the divided blocks. A stitch is sown across the width of the strap, above the tip; this keeps the two pieces separated. A piece of material 3 is left above the strap to attach the strap to the panel. The material is then stitched securely between one of the adjacent sections of the divided blocks 1, 3 a couple of inches from the bottom. The strap FIG. 3 may be placed between any section of the panel 1, 3. Two factors determine the placement of the strap; the length of the vehicle, and where the protection for the vehicle is needed most. This is either toward the front of the vehicle or the rear of the vehicle.

FIG. 1 is made to lie across the vehicles' side body longitudinally. It is generally laid underneath a vehicles' door handle, in between the front and rear wheel. To attach the apparatus to the vehicle, the front door should be opened. Blocks should be placed toward the rear of the vehicle. The strap should stop at the door opening. Put strap either between the crease of the seat, or simply put inside the vehicle, and close the door onto the strap. The strap should be left inside of the vehicle. Lay the remaining blocks onto the vehicle toward the front. The apparatus is now properly attached.

I claim:

1. Apparatus for protecting a vehicles side body panel from dents and scratches, having an exterior surface, and interior surface, a thickness, an upper border, a lower border, and two side borders, comprised of:
   a flexible panel comprised of multi-section interior padding that is completely covered by a separate material that forms an exterior;
   the panel is further comprised of strips of covered padding placed longitudinally along an upper portion of the exterior of the flexible panel, one being place on each section of the panel, the panel is further comprised of magnetic strips placed longitudinally along the upper portions on a surface opposite the multi-section padding, on each strip of covered padding;
   an elongated flexible strap extends from a space between adjacent sections of the interior padding, the strap placed at a lower portion of the panel to be placed inside of the vehicle and between the door and door sill, the strap has a tip that is sufficiently thick so that the panel can not be removed when the door is closed, the tip is thicker than the rest of the strap.

2. Apparatus as in claim 1 wherein said two side borders are sewed across a width of the panel.

3. Apparatus as in claim 1 wherein said upper border and lower borders are sewed across a length of the panel.

4. Apparatus as in claim 1 wherein said multi-section padding extends longitudinally.

5. Apparatus as in claim 1 wherein said interior of padding is generally divided into at least 3 sections.

6. Apparatus as in claim 1 wherein said elongated flexible strap is attached to the panel by stitching.

7. Apparatus as described in claim 1 wherein said panel is comprised of at least 4 sections, the strap is attached to a spaced defined between adjacent sections that are interior sections in a longitudinal direction of the panel.

8. Apparatus as in claim 1 wherein thickness of said tip is between ½ inches to 1½ inches thick, sufficient for panel to not be removed from vehicle.

* * * * *